United States Patent Office 3,161,664
Patented Dec. 15, 1964

3,161,664
MANUFACTURE OF ORGANOMETALLIC ACIDS AND SALTS THEREOF
David O. Depree, Rancho Cordova, Calif., assignor to Ethyl Corporation, New York, N.Y., a corporation of Virginia
No Drawing. Filed Apr. 16, 1962, Ser. No. 187,972
11 Claims. (Cl. 260—429.7)

This invention is concerned with a process for the manufacture of novel organometallic polymers. This application is a continuation in part of my copending application Serial No. 759,426, filed September 8, 1958, and since abandoned.

Accordingly, it is an object of this invention to provide a new and novel process for the direct preparation of polymers. A particular object is to provide a direct process for the preparation of organometallic polymers by the reaction between a metallometallic acetate and an organometallic compound more fully defined hereafter. Still another object of the present invention is to provide a process for producing novel organometallic polymers by the reaction of a metallometallic acetate with an organo Group IV A metal polyhalide.

These and other objects of this invention are accomplished by the reaction of a metallometallic acetate wherein the metallo and metallic elements are selected from the group consisting of alkali and alkaline earth metals with an organo-metallic compound containing a functional group attached to said metallic substituent, reactive with the aforementioned alkali and alkaline earth metals, said organo group being a hydrocarbon group and said functional group being a halogen. The reaction is more fully illustrated by reference to the following illustrative formula:

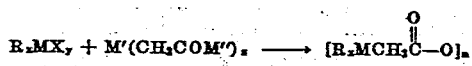

In the above formula R may be a hydrocarbon group containing from 1 to about 20 carbon atoms but preferably is a hydrogen group containing from 1 to about 10 carbon atoms inclusive.

M is a metal or metalloid element having a valence of 4, and is a metal or metalloid element of Group IV A of the Periodic Chart of the Elements as presented in the "Handbook of Chemistry and Physics," 35th edition, Chemical Rubber Publishing Company at page 392. In other words, these Group IV A elements are silicon, germanium, tin and lead.

The subscripts $x$ and $y$ are integers having a value of 1 through 2 and 2 through 3 respectively, the sum of $x+y$ being equal to the valence of the metal M.

X represents a halogen atom, i.e., fluorine, chlorine, bromine and iodine. Chlorine and bromine are the preferred halogens.

M' and M'' of the acetate reactant are alkali or alkaline earth metals which can be the same or different. Thus, the alkali and alkaline earth metals which may be present in this reactant are lithium, sodium, potassium, rubidium, cesium, beryllium, magnesium, calcium, strontium and barium. It is preferred to employ alkali metals, sodium being the alkali metal most preferred. The alkali metals are generally more reactive in the process of this invention, sodium having the additional advantages of ready availability and low cost.

The subscript $z$ is 1 or 2 and depends on the valence of the metal M'. Thus $z$ is 1 when M' is an alkali metal.

The subscript $n$ is an integer representing the number of repeating molecular units of the polymer. Thus $n$ is an integer ranging from about 4 to about 90. Generally the average value of $n$ ranges from about 8 up to about 45.

In a preferred embodiment of this invention, alpha-sodio-sodium acetate is reacted with a hydrocarbon metallic polyhalide wherein each hydrocarbon group contains 1 to about 10 carbon atoms. This reaction is generally conducted in an inert solvent. Of these hydrocarbon metallic halides it is especially preferred to utilize a hydrocarbon tin halide wherein the hydrocarbon group is defined as above. The resultant tin polymers are useful for a variety of applications.

Generally in order to avoid excessive by-product formation and to achieve high yields, it is preferred to employ essentially stoichiometric proportions of the reactants. However, greater than stoichiometric amounts of the halide reactant may be employed. Thus the ratio of halide to salt reactant generally ranges from about 1 mole of halide to 1 mole of metallometallic salt up to about 5 moles of halide reactant per mole of metallometallic salt.

A still further embodiment of the present invention is the provision of the novel organometallic polymers produced by the above process. These have the formula

wherein R is an organo group corresponding to the organo group of the organo Group IV A metal halide reactant; subscript $x$ is an integer having a value of 1 or 2; and M is a metal selected from the group consisting of the Group IV A metals and metalloids, i.e., silicon, germanium, tin and lead. The subscript $n$ is an integer representing the average number of repeating molecular units of the polymer. Thus, the average value of $n$ ranges from about 8 up to about 45.

Since the reaction producing the polymer is initially exothermic no external application of heat is necessary in the beginning. However, it is generally desirable in some instances to apply heat after the initial exothermic reaction is expended. Thus, reaction temperatures generally range from about 60° C. up to the boiling point of the particular solvent system employed, e.g., 200° C.

The novel process and products provided herein will be more particularly understood from a consideration of the following examples. In these examples, all parts and percentages are by weight unless otherwise specified.

Example I

Alpha-sodio-sodium acetate is prepared by the reaction of 7.8 parts of finely divided sodium amide with 24.6 parts of finely divided, anhydrous sodium acetate under a nitrogen atmosphere at a temperature between about 180° and 235° C. with continuous evolution and removal of ammonia and agitation. To the product (1.0 mole) thus obtained is added 0.5 mole of dimethyl dichlorosilane and about 200 parts of the dimethyl ether of diethylene glycol as a diluent. The mixture is heated externally in a nitrogen atmosphere to reflux temperature and maintained at this temperature for six hours. Thereafter the reaction vessel was cooled to about 25° C. and the solid product was filtered off.

In this manner a polymeric substance is obtained having the repeated molecular structure

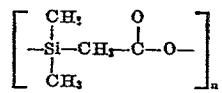

When decyl germanium dibromide is substituted for the chloride in the above example, equally good results are obtained. Likewise, when substituting alpha-potassio-potassium acetate, alpha-lithio-sodium acetate, and the like for alpha-sodio-sodium acetate in this example the same general polymeric derivatives are obtained.

Example II

Dimethyl tin dichloride (5 parts) was added to a reaction vessel containing 60 parts by volume of tetrahydrofuran after which was added 4.8 parts of alpha-sodio-sodium acetate. An immediate exothermic reaction occurred. After 10 minutes the mixture was heated to the reflux temperature of the system for one hour. Thereafter, the mixture was hydrolyzed with dilute hydrochloric acid and the clear organic layer was separated and evaporated to dryness. The solid polymer was recrystallized from a mixture of benzene and n-hexane to give 4.03 parts of a white, waxy, granular solid melting at 232°–233° C. The product was submitted to analysis which indicated that the product had a structure

wherein $n$ represents an integer demonstrating repeating molecular structure. The carbon hydrogen analysis demonstated the following:

Calcd. for $C_4H_8O_2Sn$: C, 23; H, 4; Sn, 57. Found: C, 22.; H, 4; Sn, 57

The molecular weight of the tin polymer was in the range of about 2300 to 3500 as indicated by cryoscopic molecular weight determination in benzene. Hence, $n$ in the above formula ranged from about 20 to about 30 and was on the average about 25.

Example III

Alpha-sodio-sodium acetate (4.8 parts) was added to a reaction vessel containing 70 parts by volume of tetrahydrofuran to which was added 7 parts of di-n-butyl tin dichloride. An immediate exothermic reaction occurred at ambient temperature during which time the reaction mass was stirred (1 hour). The mixture was refluxed for one hour and then hydrolyzed with dilute hydrochloric acid. The organic layer was separated and dried over sodium sulphate. The product was then distilled under reduced pressure 1.66 parts being collected. The recovered product was a white, waxy, crystalline solid having a molecular weight of 1580. Thus the product has a formula

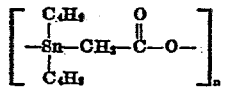

Wherein $n$ is an integer having a value of about 8.

The novel organometallic polymer products obtained by this process generally melt above 200° C. The molecular weight of these polymers generally ranges from about 500 up to about 10,000. The preferred molecular weight ranges from about 1,000 to about 5,000 since polymers within this range are more useful as plasticizer additives in various plastics and polymers.

The organometallic compound $R_xMX_y$ comprising one of the reactants of the instant invention is more fully illustrated by the following typical examples. These are: methyltin trichloride, eicosyl tribromo silane, dimethyl dichlorosilane, dimethyl tin dichloride, di-n-butyl tin dichloride, dipropyl germanium dibromide, octyl tin trichloride, decyl lead triiodide, dicyclohexyl tin difluoride, dibutyl difluorosilane, dibenzyl lead dibromide, benzyl lead trichloride, diethyl lead dichloride, methyl ethyl lead dichloride, methyl lead trichloride, and the like. In any of the above specific examples the organic substituents can also be a cycloalkyl group such as cyclohexyl, cyclopentyl, cycloheptyl and the like. Also cycloalkenyl groups can be employed such as cyclohexenyl, cyclopentadienyl, cycloheptatrienyl and other similar cycloalkenyl groups. Similarly alkenyl groups can be substituted in the above specific examples such as vinyl, propenyl, butadienyl, hexenyl and the like groups. Certain alkynyl groups can be substituted in the above specific examples such as ethynyl, hexynyl, heptynyl, and the like groups. In addition alkaryl groups can be employed as, for example, benzyl, phenyl ethyl, xylenyl, alpha-butyl naphthyl and so on.

In general the one or two hydrocarbon groups of these hydrocarbon halides are preferably lower alkyl groups (e.g., each containing up to about 6 carbon atoms), cycloalkyl groups (e.g., each containing from about 5 to about 8 carbon atoms), aryl groups (e.g., each containing from about 6 to about 10 carbon atoms) or aralkyl groups (e.g., each containing from about 7 to about 10 carbon atoms). Generally the resultant polymers having hydrocarbon groups within the above ranges have the most desirable properties in the end plasticizer uses.

The metallometallic acetates are those wherein the metalling elements are selected from the group consisting of alkali and alkaline earth metals. Those compounds are depicted above by the illustrative and non-limiting formula:

wherein M' and M" can be the same or different and are selected from the alkali and alkaline earth metals; $z$ is a small whole number dependent upon the valence of the metallic element M'. It should be noted that the above formula is merely representative of the types of compounds employed herein. The true structure of the reactants is dependent upon the valence of both metals in the molecule. Where both metals are bivalent the compound becomes more complex, having a structure $M'_x(CH_2COO)_yM''_z$ wherein $x$, $y$ and $z$ are small whole numbers which can be the same or different and are dependent upon the valences of the metallic elements M' and M". The alkali metals are intended to include all the metals of Group I A of the Periodic Table. The alkaline earth metals include all the elements of Group II A of the Periodic Chart of the Elements, as presented in the "Handbook of Chemistry and Physics," 35th edition, Chemical Rubber Publishing Company at page 392. Among the compounds thus defined are included alpha-lithio-sodium acetate, alpha-sodio-potassium acetate, alpha-sodio-calcium acetate, and the like. Accordingly, any of the aforementioned alpha-metallometallic acetates and others can be substituted for the corresponding compounds employed in Examples I through III above and produce similar results. The compounds in which the metallic elements are the alkali metals, particularly sodium, are especially preferred because of their greater reactivity. One such particularly preferred reactant is alpha-sodio-sodium acetate.

While the novel process for producing polymers has been discussed with specific reference to alpha-metallometallic acetates, it should be understood that other metallometallic salts may be employed as reactants. Typical examples of these metallometallic salts are alpha-sodio-sodium-p-toluate, sodio-sodium benzoate, gamma-sodio-sodium crotonate, alpha-potassio-potassium - p - toluate, alpha-lithio-potassium benzoate, and the like.

The reaction temperature is generally above 60° C. up to about 200° C. but below the decomposition temperature of the reactants. The reaction is usually conducted at a temperature above 100° C. Best results are obtained at a temperature between 100° C. and 200° C. Shorter reaction times and better yields of products are obtained at the higher reaction temperatures. When lower temperatures are employed it is usually necessary to employ a correspondingly longer cook period resulting in relatively longer total reaction times.

The reaction usually is conducted at atmospheric pressure, although in some instances better results are obtained at sub-atmospheric and super-atmospheric pressures.

The reaction period may vary over a wide range. Thus in some cases the reaction is essentially instantaneous and in other cases longer reaction periods are required. In general, reaction periods of ½ minute to 10 hours are employed. Ordinarily, however, periods no longer than 6 hours are required in order to effect completion of the reaction.

In order to avoid side effects and decomposition of the metallometallic acetate, it is preferable that the reactants be in essentially anhydrous condition. In this connection although not absolutely essential, an inert atmosphere can be employed during the course of the reaction. Typical examples of such inert atmospheres are the gases nitrogen, neon, argon, krypton and the like, or a dry atmosphere.

As indicated in the examples, diluents are generally employed when performing this invention. Such diluents ordinarily are not required when the organohalide is a liquid although for more efficient agitation and contact of the reactants, diluents are generally employed. In general, the criteria of choice of such diluents are that they be liquid under the reaction conditions and substantially inert to the reactants. The hydrocarbons and others are particularly suitable for this purpose. Typical examples of such solvents are the pentanes, octanes and like paraffinic hydrocarbons containing up to about 18 carbon atoms; cycloparaffins, e.g., cyclohexane, methyl cyclohexane and the like; aromatics, e.g., benzene, toluene, xylenes, meistylenes and the like; and mixed hydrocarbons, e.g., heavy alkylates, mineral oil, petroleum ether, naphthas, and the like. Among the ethers are included the alkyl ethers such as diamyl ether, butyl amyl ether, the polyethers including, for example, the dimethyl, diethyl and the like ethers of ethylene glycol, diethylene glycol and the like, dioxane, tetrahydrofuran, and the like. Still other solvents will now be evident to those skilled in the art. It is preferable, because of greater availability and less reactivity with the metallometallic acetate to employ the liquid hydrocarbons as diluents.

The polymers produced by the processes of this invention find widespread utility in diverse applications. For example, the organotin polymers produced by the processes of this invention are useful as stabilizers in polymers such as polyvinyl chloride and the like. The addition of minor amounts of these organotin polymers to the polyvinyl chloride (e.g., 0.5–10 percent by weight) is usually sufficient. The novel polymers of this invention may also be used as combination stabilizer-plasticizers for a variety of known polymers in which stabilizers and plasticizers are normally used. The tin and lead polymers may be used as fungicide additives in paint and the like.

Having thus described this invention and its embodiments, it is not desired to be bound except as set forth in the following claims.

I claim:

1. As a composition of matter an organometallic polymer having the formula

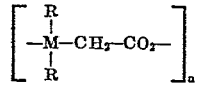

wherein R is a hydrocarbon group having 1 to about 10 carbon atoms; M is an element selected from the group consisting of silicon, germanium, tin and lead; $n$ is an integer having a value of from about 4 to about 90.

2. The composition of claim 1 wherein M is tin.

3. As a composition of matter an organometallic polymer having the formula

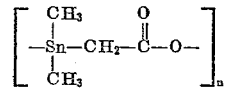

wherein $n$ is an integer having a value of from about 8 to about 45.

4. As a composition of matter an organometallic polymer having the formula

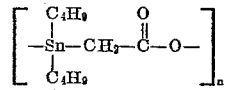

wherein $n$ is an integer having a value of from about 8 to about 45.

5. A process for producing organometallic polymers of the formula $[R_2M\text{---}CH_2\text{---}CO_2\text{---}]_n$, wherein R is a hydrocarbon group having from 1 to about 10 carbon atoms, M is an element selected from the group consisting of silicon, germanium, tin and lead, and $n$ is an integer having a value of from about 4 to about 90 comprising reacting (a) an alpha-metallometallic acetate wherein the metals are selected from Groups I–A and II–A of the periodic system of the elements with (b) a hydrocarbon Group IV A metal dihalide having 1 to about 10 carbon atoms in each hydrocarbon group; said reaction being conducted in an inert solvent; said Group IV A metal being selected from the group consisting of silicon, germanium, tin and lead.

6. The process of claim 5 wherein the metallo and metallic elements of said acetate are both alkali metals.

7. The process of claim 5 wherein said acetate is alpha-sodio-sodium acetate.

8. The process of claim 5 wherein said dihalide is dimethyl tin dichloride.

9. The process of claim 5 wherein said dihalide is dibutyl tin dichloride.

10. The process of producing an organotin polymer comprising reacting (a) alpha-sodio-sodium acetate and (b) dimethyl tin dichloride in tetrahydrofuran.

11. The process of producing an organotin polymer comprising reacting (a) alpha-sodio-sodium acetate and (b) dibutyl tin dichloride in tetrahydrofuran.

References Cited in the file of this patent

UNITED STATES PATENTS 2,745,819    Mack et al.   ----------- May 15, 1956

OTHER REFERENCES

Chambers et al.: J.A.C.S. 48, No. 4, pp. 1054–1062 (April 1926).

De Pree et al.: J.A.C.S. 80, No. 9, pp. 2311–2313 (May 5, 1958).